United States Patent [19]

Kawamata et al.

[11] Patent Number: 4,989,163
[45] Date of Patent: Jan. 29, 1991

[54] PHOTO PRINTER HAVING A HOST COMPUTER ASSIST FUNCTION AND METHOD OF CONTROLLING THE SAME

[75] Inventors: Yoshio Kawamata; Syoichi Ito, both of Ibaraki; Katsufumi Takagishi, Hitachi, all of Japan

[73] Assignee: Hitachi, Ltd., Tokyo, Japan

[21] Appl. No.: 225,782

[22] Filed: Jul. 29, 1988

[30] Foreign Application Priority Data

Jul. 31, 1987 [JP] Japan .................... 62-192449

[51] Int. Cl.$^5$ .............................. G03B 15/00
[52] U.S. Cl. .................... 364/519; 346/33 R; 340/799
[58] Field of Search ............... 364/518–522; 346/33 R; 340/747, 750, 798–800

[56] References Cited

U.S. PATENT DOCUMENTS

| 4,648,047 | 3/1987 | Berkland et al. | 364/519 |
| 4,679,153 | 7/1987 | Robinson et al. | 364/523 |
| 4,694,405 | 9/1987 | Bradbury et al. | 364/518 |
| 4,706,099 | 11/1987 | Suzuki | 346/160 |

OTHER PUBLICATIONS

Nikkei Electronics, Feb. 9, 1987, pp. 144–145, and Apr. 20, 1987, pp. 160–161.

Primary Examiner—Dale M. Shaw
Assistant Examiner—H. R. Herndon
Attorney, Agent, or Firm—Antonelli, Terry, Stout & Kraus

[57] ABSTRACT

A photo printer system comprises a magnetic storage for storing a print data sent from a host computer, a bit map memory for storing a print dot data, and a printer engine for printing the contents of the bit map memory. The system includes a program which operates on the magnetic storage to serve as an external storage for the host computer and on the bit map memory to serve as a cache memory in response to a data read/write command issued by the host computer, and a CPU which controls the execution of the program. At least in a non-print process mode, the system forms a data path so that the host computer can access to the bit map memory and magnetic storage so as to have a bidirectional data read/write operation. In another mode, the system forms a data path so that image data picked up with an image scanner is saved directly in the bit map memory and the image data is sent to the host computer by request.

13 Claims, 7 Drawing Sheets (ENLARGEMENT (2-FOLD))

(ROTATION (θ DEGREES))

PHOTO PRINTER HAVING A HOST COMPUTER ASSIST FUNCTION AND METHOD OF CONTROLLING THE SAME

CROSS REFERENCES TO RELATED APPLICATIONS

This application relates to a U.S. application, Ser. No. 145,312 filed Jan. 19, 1988, entitled "Method of Controlling Photo Printer and Apparatus Therefor", by Katsufumi Takagishi and Syoichi Ito, and assigned to the present assignee, of which the disclosure is incroporated herein by reference.

BACKGROUND OF THE INVENTION

The present invention relates to a photo printer, and particularly to a photo printer controller having a nonvolatile memory, such as a large-capacity magnetic storage, and a volatile memory, such as a bit map memory. The invention further relates to a photo printer controller suitable for use in a computer system including an image scanner as an input device, and to the method of operation of the system.

Photo printers represented by laser beam printers, featuring low-noise, high-quality and high-speed, are now replacing conventional wire dot matrix printers and creating a new market known as desk-top publishing. A photo printer is controlled by a printer controller which converts coded print data of characters, figures and graphs sent from a host computer into print dot data which is stored in a bit map memory. The photo printer controller incorporates the bit map memory having several megabytes capacity with a magnetic storage, such as a hard disk, or floppy disk for storing character fonts and saving temporarily print data sent from the host computer, and the bit map memory has a capacity of 2 megabytes for storing a A3-size page in a print density of 300 DPI (dot per inch), or 8 megabytes for a print density of 600 DPI, as described in Japanese publication "NIKKEI ELECTRONICS", Feb. 9, 1987, pp. 144–145

Another article in "NIKKEI ELECTRONICS", Apr. 20, 1987, pp. 160-161, describes that a conventional desk-top publishing system includes a personal computer which is a host computer which is directly connected with an image scanner and a photo printer with a built-in controller, and image data picked up by the image scanner is processed for enlargement, reduction, etc., by the CPU of the host computer and text areas and graphic areas are merged to complete a document page. The amount of data transferred from the image scanner to the host personal computer is as large as 1 megabyte for a A4-size page in 2-tone (black/white) printing with an image scanner having a dot density of 300 DPI.

Conventional photo printer controllers have their interface with host computers limited to one-way data transmission from host computer to printer, as in the CENTRONICS interface, or to low-speed bidirectional data transmission as slow as 19 kilobits/sec, as in the RS232C interface, and have their software designed to perform one-way control for solely printing data sent from the host computers. Therefore, when the printer is not working, the large-capacity magnetic storage and the bit map memory in the controller are idle (refer to U.S. Pat. No. 4 694,405).

Recently, standardization of the interface is under way for small computer's peripheral devices including hard disk units, floppy disk units, image scanners and printers, and this SCSI (Small Computer System Interface) provides a capability of 1.5 megabytes/sec, bidirectional, parallel data transmission.

In order for a small computer system to have a faster access to its hard disk or floppy disk storage, it is known that the storage needs to be provided with a memory for buffering disk transaction data. However, in the case of a conventional small computer system including a storage with associated cache memory and a photo printer, memories are separated in the host computer and photo printer, resulting in their inefficient use.

On the other hand, when a desk-top publishing system is designed to deal with a full-page data at once, a conventional host personal computer needs to have a memory of that capacity, resulting in an expensive system. In addition, the host computer has its system bus occupied by the high-speed data transfer from the image scanner, and it cannot be used for other processing during the data reading.

In an opposing case where a host personal computer is provided with only a small-capacity memory and image data from an image scanner is written into the memory in blocks, the system expends excessive time for data writing and the print quality of the written image can be degraded at the boundary of data writing blocks due to the structure of the image scanner. The combination of an image scanner and a printer controller for completing a printing system is disclosed in U.S. Pat. No. 4,706,099.

In any of the foregoing system configurations, when image data is to be edited for enlargement, rotation, etc., the data needs to be divided into small blocks for processing due to the limited memory capacity, and this will require an intricate management and troublesome operations.

SUMMARY OF THE INVENTION

The present invention is an improvement of the system disclosed in U.S. patent application Ser. No. 145,312 which is intended to overcome the foregoing prior art problems, and an object of the present invention is to provide a low cost-to-performance photo printer and its control method which allow the use of a nonvolatile memory, such as a magnetic storage, and a volatile memory, such as a bit map memory, which previously have been used solely for printing operations, for a data storage function and associated cache memory of the host computer, as well as for data printing operation.

Another object of the present invention is to provide a photo printer and its control method which allow the use of a high-capacity memory and hardware resources including a high-speed print dot data developing circuit in the printer controller, which previously have been used solely for printing operation, for a buffer in reading data from the image scanner and image data editor, as well as for data printing operations, with the result that, the resources of printer controller are used more efficiently and the processing load of the host computer's CPU is reduced drastically.

The first feature of the present invention for attaining the above primary object resides in a photo printer controller comprising communication means for performing high-speed bidirectional data communication with a host computer, nonvolatile memory means, such as a magnetic disk, and volatile memory means, such as a bit map memory, data conversion means for converting coded print data sent from the host computer through the communication means into print dot data to be stored in part of the volatile memory means, and dot data reading means for reading out the print dot data into a photo printer engine. The printer controller CPU has its software (program) designed such that, besides the usual document print command from the host computer, when the controller has received a data write command it stores data from the host computer in a certain area of the nonvolatile memory means and when the controller has received a data read command it reads data out of the area of the nonvolatile memory and sends the data to the host computer. The printer controller's CPU has its software (program)designed such that the volatile memory means is used as a cache memory when the nonvolatile memory means is accessed for writing or reading data.

The second feature of this invention for attaining the above other object resides in a photo printer controller comprising communication means which performs bidirectional data communication with a host computer, a volatile memory, data conversion means which converts coded print data sent from the host computer through the communication means into print dot data to be stored in the volatile memory means, and dot data reading means which reads out the print dot data into the photo printer engine. The printer controller's CPU has its software designed such that, in response to a command from the host computer, it reads out image data from the image scanner into the volatile memory and implements data editing, such as image enlargement and rotation and data compression, for the host computer until the final data form is reached, and thereafter it sends the image data to the host computer.

Based on the first feature of the present invention, i.e., the nonvolatile memory means in the printer controller is assigned as an auxiliary storage for the host computer and, in response to a data write/read command from the host computer, the volatile memory means is used as a cache memory for the nonvolatile memory means in writing or reading data, a nonvolatile memory, such as a magnetic storage, and a volatile memory, such as a bit map memory, can be used as a data storage for the host computer, as well as for the usual printing role operations.

Based on the second feature of the invention, i.e., interface means is provided between the printer controller and the image scanner, and image data read out of the image scanner is stored temporarily in the volatile memory of the printer controller and thereafter is sent to the host computer in response to a command, the large-capacity volatile memory in the printer controller can be used in common as a buffer in reading data from the image scanner, and this effective use of the controller memory in the rest of the printing prevents the host computer from requiring a larger-capacity memory.

The volatile memory in the printer controller is large enough in capacity to hold a full page of data from the image scanner, and this prevents the degraded image quality, which has been a problem, and allows the controller to perform editing processes, such as image enlargement and rotation, as well as data reading from the image scanner. The host computer is relieved of being timed for its data fetching to the operation of the image scanner and of having its system bus occupied by the data transfer, and consequently it is capable of implementing other processes concurrently with the image data processing.

DESCRIPTION OF THE PREFERRED EMBODIMENTS

Embodiments of the present invention will be described with reference to the drawings.

Figure 1:
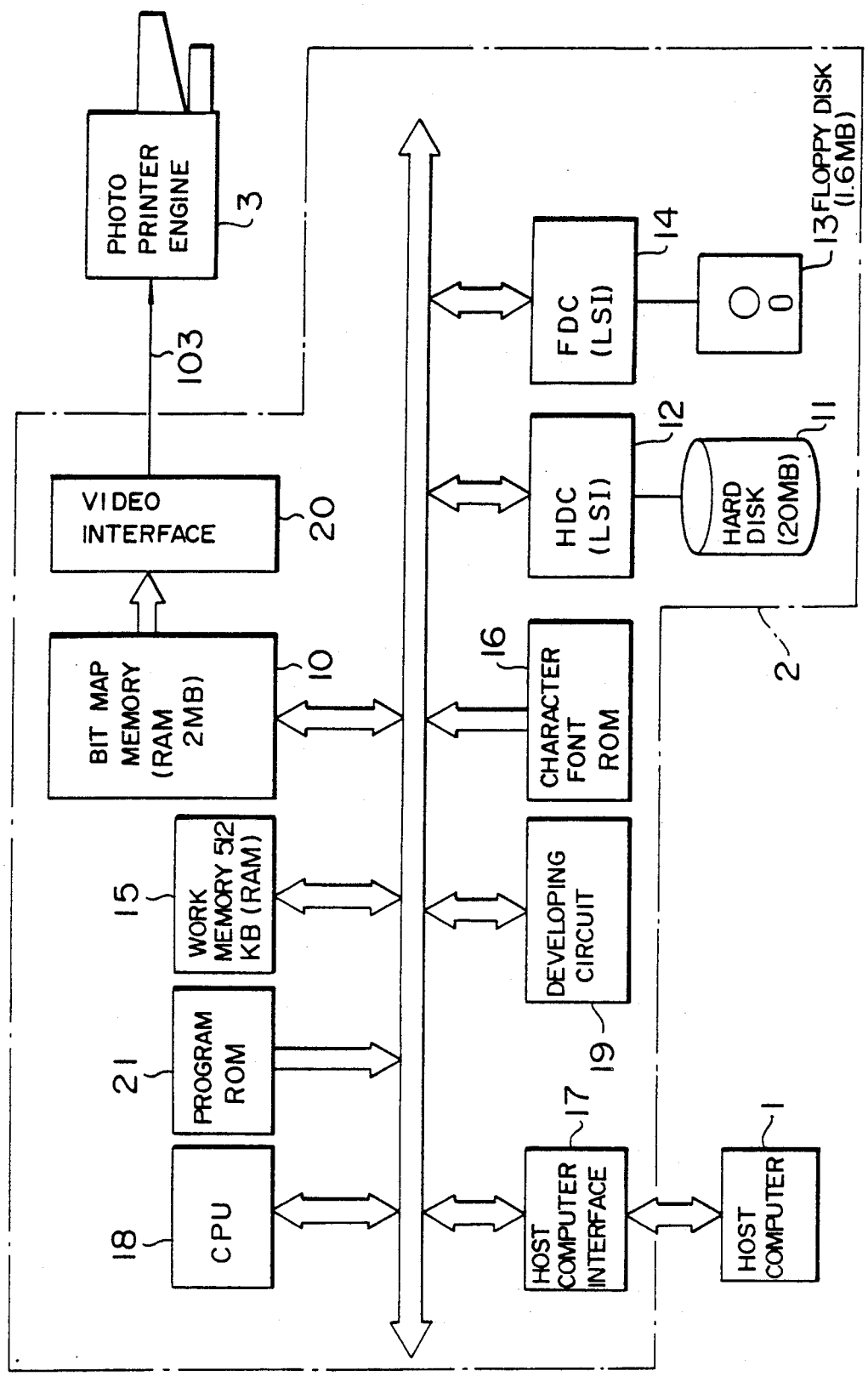
FIG. 1 is a block diagram showing an overall arrangement of the printer controller in the photo printer system according to an embodiment of the present invention.
Figure 2:
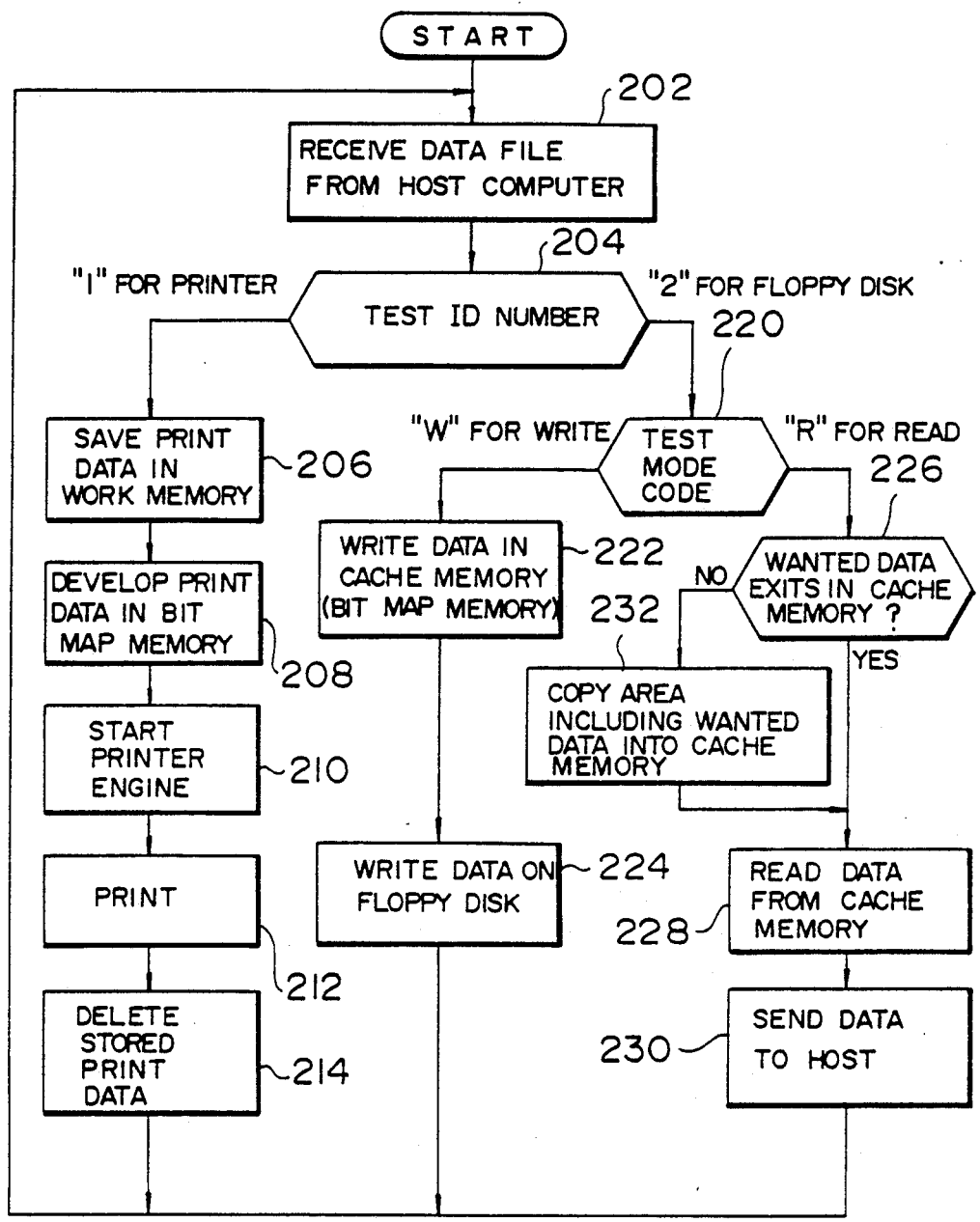
FIG. 2 is a flowchart explaining the operation of the printer controller of FIG. 1.

FIGS. 1 through 3 show an embodiment in which a floppy disk is used as a nonvolatile memory. In FIG. 1 showing the overall arrangement of the printer controller in the photo printer system, a host computer 1 and a controller 2 are connected by a bidirectional parallel interface (SCSI) 101, and the controller 2 is connected with a photo printer engine 3 through a high-speed serial video interface 103. Indicated by 10 is bit map memory made up of a 2-megabyte RAM for storing an A3-size page in a print density of 300 DPI, 11 is a hard disk, 12 is an LSI-based hard disk controller (HDC), 13 is a floppy disk, 14 is an LSI-based floppy disk controller (FDC), 15 is a work memory in the form of a RAM, 16 is a character font ROM which stores dot data of print characters, 17 is a host computer interface circuit, 18 is a CPU incorporating a DMA (direct memory access) function, e.g., an Intell 80186 CPU, 19 is a developing circuit which develops text, graphic and image data into a dot pattern on the dot map, 20 is a video interface circuit which reads parallel dot data out of the bit map memory 10 and converts the data into serial data to be delivered to the photo printer engine 3, and 21 is a program ROM which stores the program for running the CPU 18.

The character fonts and controller CPU program are stored in the character font ROM 16 and program ROM 18, respectively, and are also recorded on the hard disk 11 and floppy disk 13 so that they are expediently loaded into the work memory 15 by way of the CPU 18 for the execution of character development and the like for adaptation to the bit map memory 10.

Figure 3A:
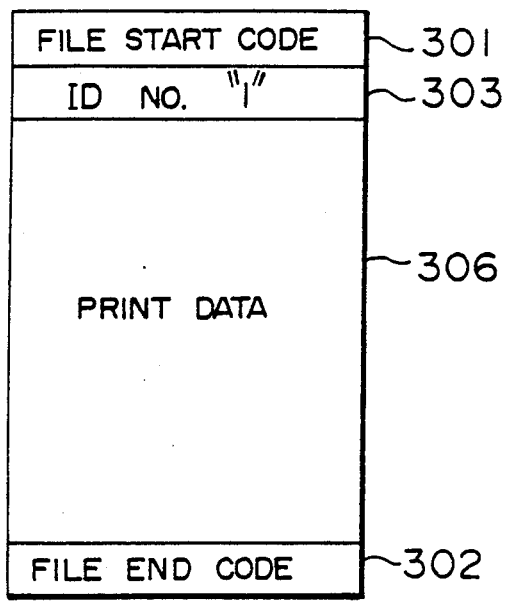
FIGS. 3A-3D are diagrams showing the formats of data files transacted between the host computer and printer controller shown in FIG. 1.
Figure 3B:
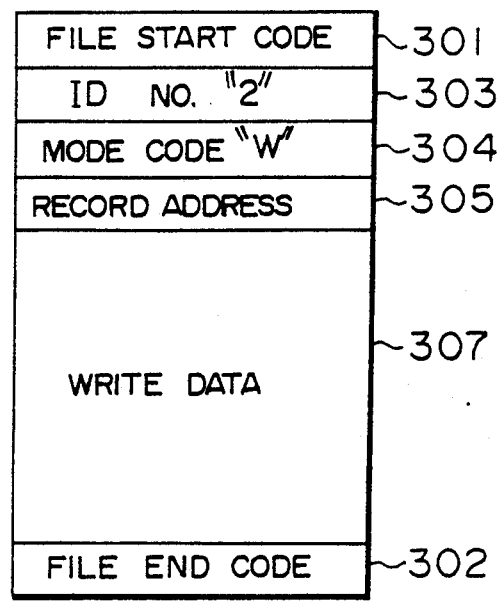
Figure 3C:
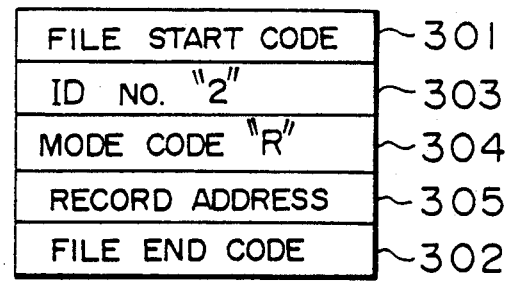
Figure 3D:
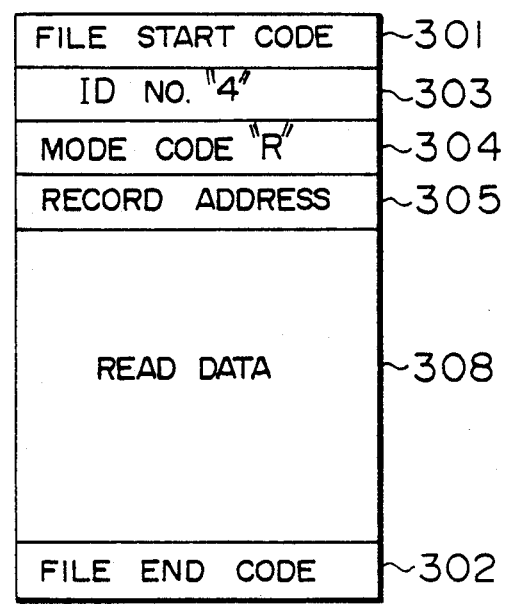

Referring to FIGS. 3A-3D showing the communication data file formats, FIG. 3A shows the content of the print command data file containing print data issued by the host computer 1 to the controller 2, FIG. 3B shows the content of the write command data file containing data transferred from the host computer 1 to the controller 2 and written on the floppy disk 13, FIG. 3C shows the content of the floppy disk read command data file sent from the host computer 1 to the controller 2, and FIG. 3D shows the content of the data file, containing data read out of the floppy disk 13 in response to the data read command, sent from the controller 2 to the host computer 1.

In the Figures, indicated by 301 is a data file start code, 302 is a data file end code, and 303 is an identification (ID) number for the data files, with ID number "1" indicating the data file of print command, with ID number "2" indicating the data file of floppy disk read/write command, and with ID number "4" indicating the data file containing data read out of the floppy disk 13. Indicated by 304 is a mode code, with mode code "W" indicating a write mode, and with mode code "R" indicating a read mode. Indicated by 305 is address information (track, sector, etc.) for writing or reading the floppy disk 13, 306 is print data, 307 is write data, and 308 is readout data.

Next, the operation of this embodiment will be described on FIG. 1 and FIGS. 3A-3D. Upon receiving a data file from the host computer 1 through the SCSI 101, the CPU 18 checks its ID number in accordance with the program in the program ROM 18: (steps 202, 204). If the ID number is found to be "1", indicative of the print command data file, the CPU 18 saves the print data 306 temporarily in the work memory 15: (step 206). If the print data 306 is too much to be held completely in the work memory 15, the CPU 18 stores part of the print data 306 on the hard disk 11 by way of the HDC 12 using the internal DMA function.

Subsequently, the developing circuit 19 develops the text, graphic and image data held in the work memory 15 (and on the hard disk 11) into dot data and stores at in the bit map memory 10: (step 208). After dot data of one page has been developed, the CPU 18 issues a print start command to the photo printer engine 3: (step 210). In synchronism with the operation of the photo printer engine 3, the video interface circuit 20 reads dot data sequentially out of the bit map memory 10 and sends the data to the photo printer engine 3 for printing: (step 212). After a complete page has been printed, the CPU 18 deletes the print data in the work memory 15 (and on the hard disk 11), and it enters the wait cycle for receiving the next data file from the host computer 1: (step 214). These are the operations of the conventional printer controller.

In case of ID number "2", the CPU 18 bases its control on the program in the program ROM 21 so that the floppy disk 13 serves as an external storage for the host computer 1. Initially, the CPU 18 checks the mode code: (step 220). If the mode code is "W", indicative of writing, the CPU 18 saves write data 307 sent from the host computer 1 temporarily in the bit map memory 10 and, after acknowledgement of the data writing to the host computer 1: (step 222), it writes the data again in a certain area of the floppy disk 13: (step 224). In this case, the bit map memory 10 is used quite differently from the case of printing as follows. With the mode code being Write or Read, the bit map memory 10 is functionally located between the host computer 1 and floppy disk 13, and it operates as a cache memory to buffer data transferred between the two. Namely, the fast access memory (bit map memory 10) is placed between the fast data transferring host computer 1 and the slow access storage device (floppy disk 13) so that the access speed of the storage device is enhanced when seen from the host computer 1. Such a cache memory is more effective as its capacity increases.

In case the ID number 13 is "2" and the mode code is Read, the CPU 18 first checks whether data of the next recording address 305 exists in the bit map memory 10 which is used as a cache memory: (step 226). If the data is found present in the bit map memory 10, the CPU 18 edits the data to make the data file format shown in FIG. 3D: (step 228), and sends it to the host computer 1: (step 230). In this case, data can be transferred to the host computer 1 without being actually read out of the floppy disk 13, resulting in a faster apparent access speed. If the requested data is absent from the bit map memory 10, the CPU 18 loads a certain unit data area including the data on the floppy disk 13 into the bit map memory 10: (step 232), before proceeding to the same operation as described above.

In this embodiment, the bit map memory 10 (2 MB) is larger in capacity than the floppy disk 13 (1.6 MB), and when the bit map memory 10 is used as a cache memory, the whole data on the floppy disk 13 can be copied in it. On this account, the host computer 1 has access the floppy disk 13 at an apparent speed equal to the access speed of the bit map memory 10, resulting in a significantly enhanced floppy disk access performance.

Although in the illustrated embodiment the floppy disk 1 is used as an external storage for the host computer 1, it may readily be replaced with the hard disk 11 with the reversion of process for the hard disk 11 similar to that for the floppy disk 13 on the flowchart of FIG. 2.

Although in the above embodiment a cache memory is provided using the bit map memory 10, the work memory 15 may be used for this purpose instead.

Figure 4:
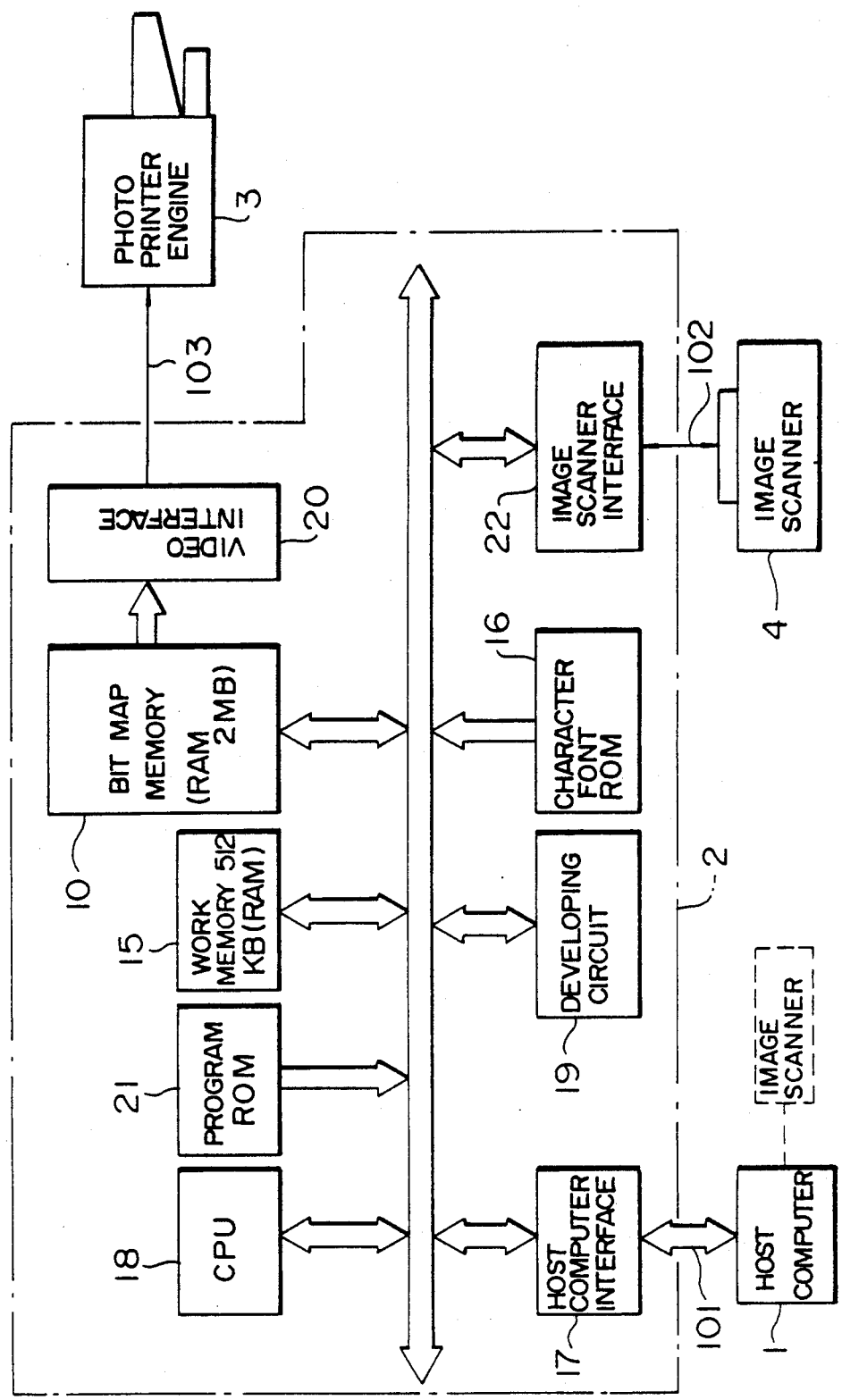
FIG. 4 is a block diagram showing an overall arrangement of the printer controller in the photo printer system according to another embodiment of the present invention.
Figure 5:
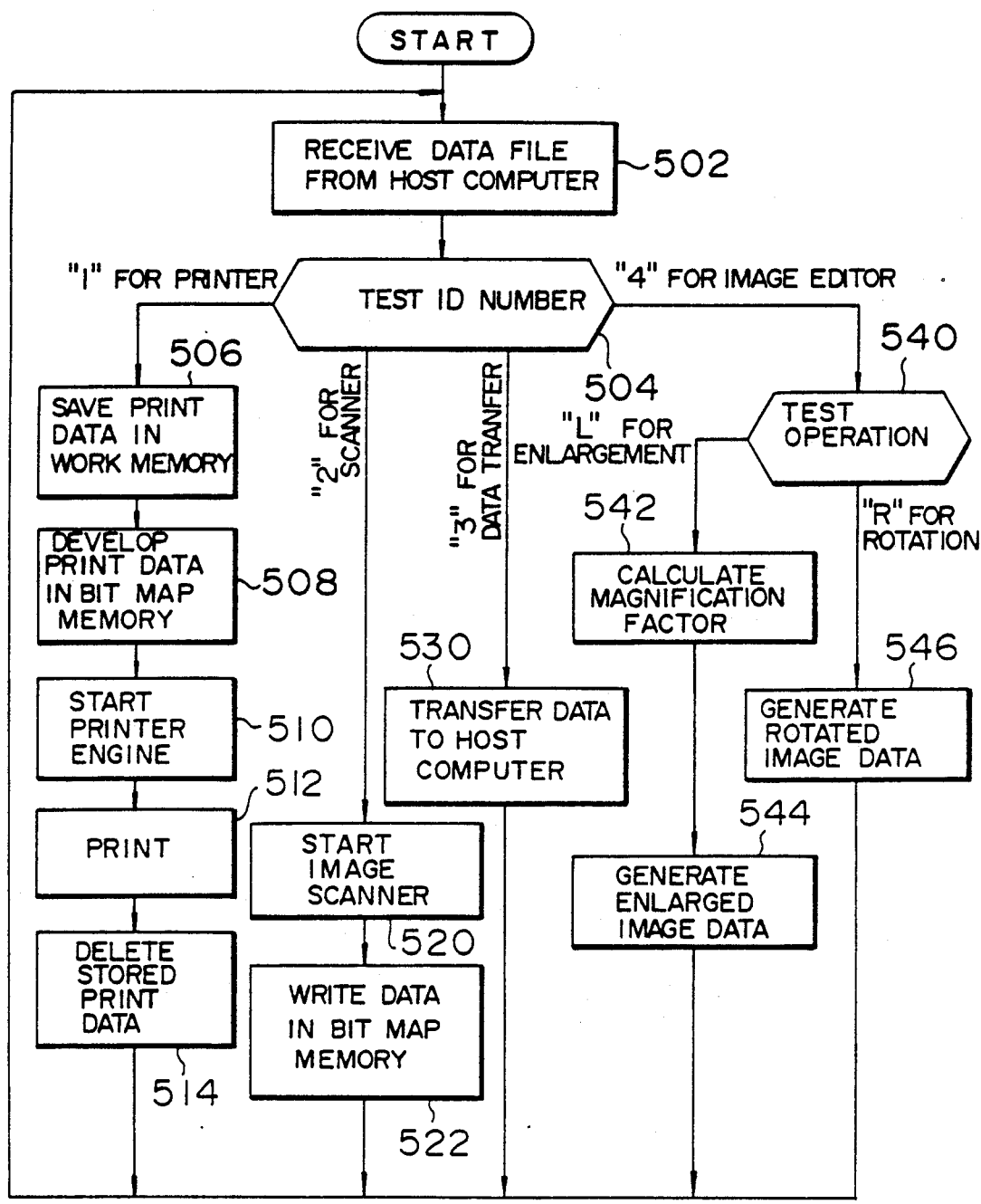
FIG. 5 is a flowchart explaining the operation of the printer controller of FIG. 4.

Next, another embodiment of the invention will be described with reference to FIG. 4 and FIGS. 7A-7F. In FIG. 4, a controller 2 and photo printer engine 3 are integrated in appearance to complete a printer. The controller 2 is connected to a host computer 1 by a bidirectional parallel interface (SCSI) 101, the controller 2 and photo printer engine 3 are connected through a high-speed serial video interface 103, and the controller 2 is further connected to an image scanner 4 by a high-speed serial interface 102.

The controller 2 incorporates a bit map memory 10 in the form a of RAM with a capacity of 2 megabytes which is equivalent to an A3-size print page in a print density of 300 DPI, a work memory 15 also provided as a RAM, a character font ROM 16 which stores character dot data, a host computer interface 17, a CPU 18 incorporating a DMA (direct memory access) function, e.g., and Intel 80186 CPU, a developing circuit 19 which develops text, graphic and image data in the bit map memory 10, a video interface circuit 20 which reads dot data in parallel out of the bit map memory 10 and sends it in serial form to the photo printer engine 3, a ROM 21 which stores the program for running the CPU 18, and an image scanner interface circuit 22.

Figure 6A:
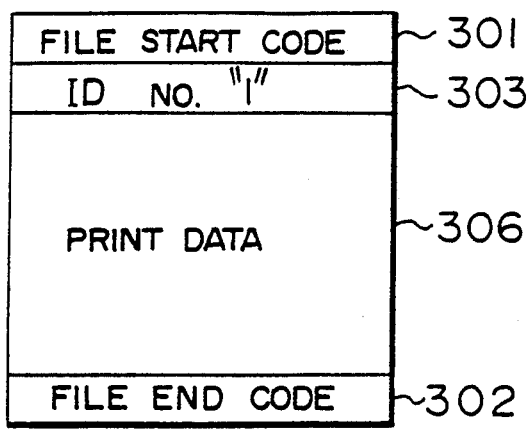
FIGS. 6A-6F are diagrams showing formats of data files transacted between the host computer and printer controller.
Figure 6B:
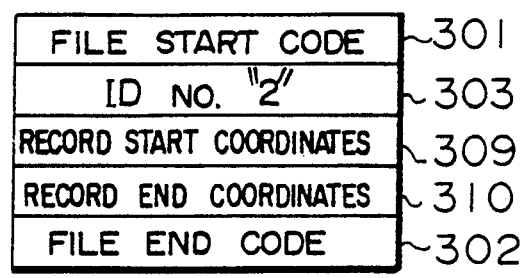
Figure 6C:
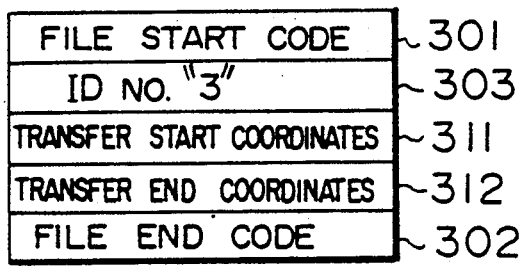
Figure 6D:
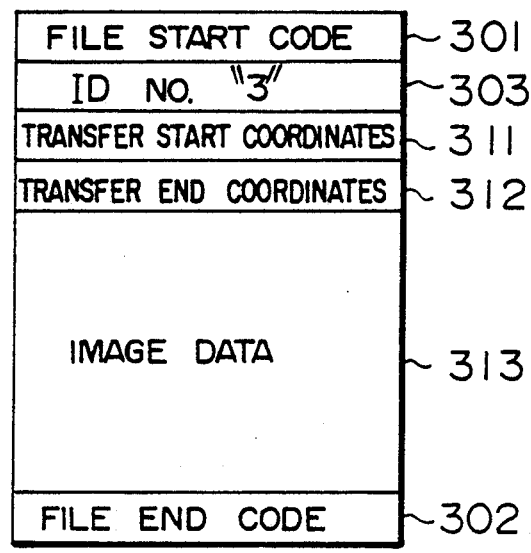
Figure 6E:
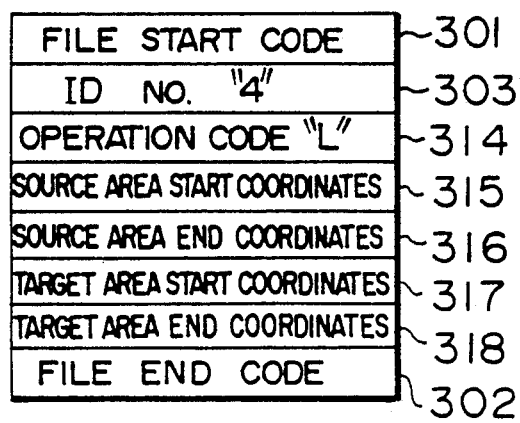
Figure 6F:
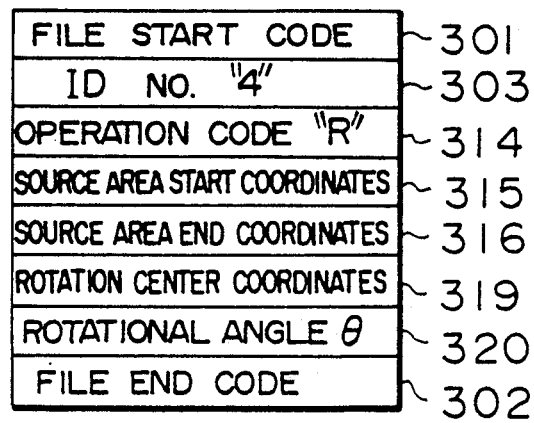

Referring to FIGS. 6A-6F showing the communication data formats, FIG. 6A shows the content of a print command data file containing print data sent from the host computer 1 to the controller 2, FIG. 6B shows the content of a recording command issued by the host computer to the controller 2 for fetching image data from the image scanner 4 into the bit map memory 10, FIG. 6C shows the content of a data transfer command issued to the controller 2 for transferring image data recorded in the bit map memory 10 to the host computer 1, FIG. 6D shows the content of the data file, containing the image data 313 of the bit map memory 10, sent from the controller 2 to the host computer 1 in response to the transfer command, and FIGS. 6E and 6F show the contents of bit map data editing commands, i.e., specifically an enlargement command and a rotation command, issued by the host computer 1 to the controller 2.

Next, the operation of this embodiment will be described on FIG. 4 and FIGS. 7A-7F. Upon receiving a data file from the host computer 1 through the SCSI 101, the CPU 18 checks its ID number in accordance with the program in the program ROM 21: (steps 502, 504). If the ID number is found to be "1", indicative of the print command data file, the CPU 18 saves the print data 306 temporarily in the work memory 15: (step 506).

Subsequently, the developing circuit 19 develops the text, graphic and image data held in the work memory 15 into dot data in the bit map memory 10: (step 508). After dot data of one page has been developed, the CPU 18 issues a print start command to the photo printer engine 3: (step 510). In synchronism with the operation of the photo printer engine 3, the video interface circuit 20 reads dot data sequentially out of the bit map memory 10 and sends the data to the photo printer engine 3 for printing: (step 512). After a complete page has been printed, the CPU 18 deletes the print data in the work memory 15, and it enters the wait cycle for receiving the next data file from the host computer 1: (step 514). These operations are identical to the conventional printer controller operations.

Figure 7A:
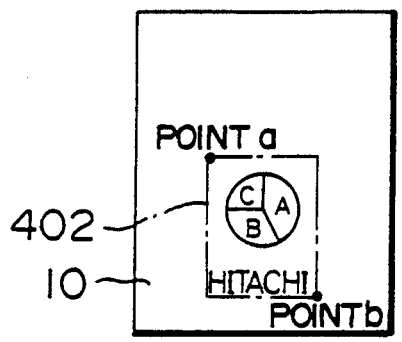
FIGS. 7A-7F are diagrams used to explain the editing processes for image data.

For ID numbers "2" through "4", the CPU 18 performs its control based on the program stored in the program ROM 21 so that the controller 2 functions as an image data processor provided outside of the host computer 1. If the ID number is "2" indicative of the recording command, the CPU 18 further receives the recording start coordinates 309 and recording end coordinates 310 and prompts the image scanner 4 through the interface circuit 22 to start the transfer of image data of a specified area: (step 520). The image data picked up by the image scanner 4 is transferred through the interface circuit 22 to the controller 2 using the DMA function of the CPU 18, and is stored in a certain area of the bit map memory 10: (step 522). FIG. 7A illustrates image data 402 loaded into the bit map memory 10 in response to the recording command, with points a and b representing the recording start coordinates 309 and recording end coordinates 310, respectively.

Figure 7B:
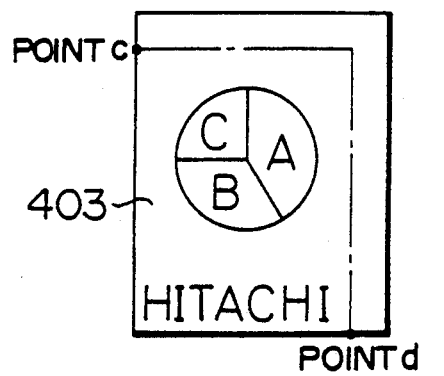

In case of ID number "4", indicative of the editing command for the image data in the bit map memory 10, the CPU 18 checks the subsequent operation code, which can be "L" for enlargement or "R" for rotation: (step 540). Upon receiving the enlargement (L) command (FIG. 6E) from the host computer 1, the CPU 18 calculates the magnification factor from the source area start coordinates 315, source area end coordinates 316, target area start coordinates 317 and target area end coordinates 318, and operates on the developing circuit 19 to carry out the enlargement of the image: (step 542). The developing circuit 19 generates enlarged image data in accordance with the magnification factor, and rewrites the bit map memory 10: (step 544). For the editing operation, the circuit 19 uses the work memory 15. FIG. 7B shows a result of the enlargement process for the image of FIG. 7A, and in these figures points a, b, c and d represent the source area start and end coordinates 315 and 316 of the area 402 before enlargement and the target area start and end coordinates 317 and 318 of the area 403 after enlargement, respectively.

Figure 7C:
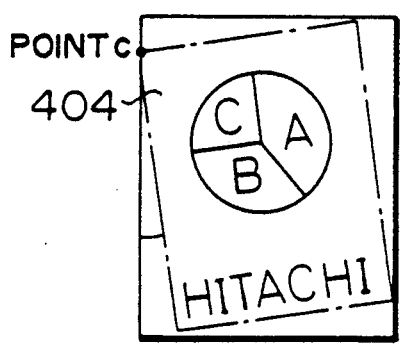

In the case of the rotation (R) command (FIG. 6F), the developing circuit 19 generates rotated image data in the bit map memory 10: (step 546). FIG. 7C shows a result of the rotation process for the image of FIG. 7B, and point c represents the target area start coordinates 315 and, at the same time, the rotation center coordinates 319, and point d represents the target area end coordinates 316.

Figure 7D:
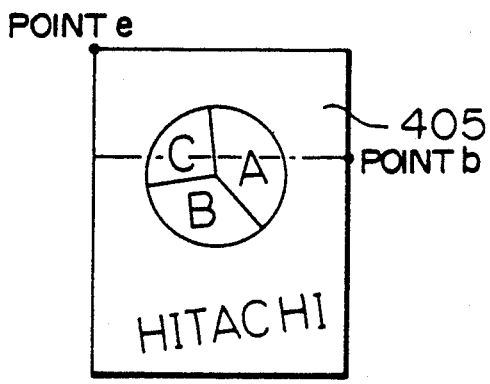
Figure 7E:
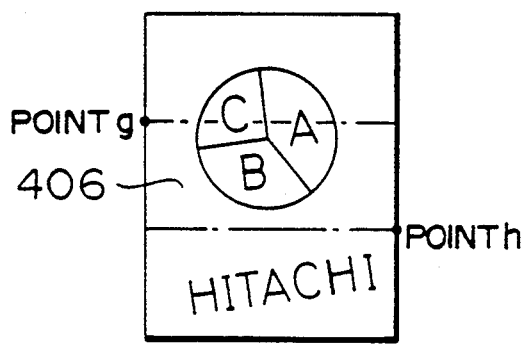
Figure 7F:
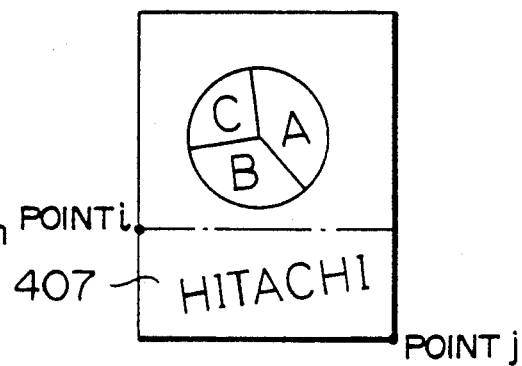

In the last case of ID number "3", indicative of the data transfer command, the CPU 18 extracts image data from the bit map memory 10 in accordance with the transfer start coordinates 311 and transfer end coordinates 312 sent from the host computer 1, and sends the data in the form of data file shown in FIG. 6D to the host computer by way of the interface 17: (step 530). FIGS. 7D, 7E and 7F show the coordinate setups of the case when the host computer 1 has requested the transfer of rotated image data (FIG. 7C) in three divisions 405, 406 and 407. For the transfer request of the area at the top of the bit map memory 10, the host computer 1 creates a transfer command data file (FIG. 6C), with the transfer start and end coordinates 311 and 312 in FIG. 6C being set to point e and f of FIG. 7D, respectively, and sends the file to the controller 2. Upon receiving the transfer command, the controller's CPU 18 sends a data file (FIG. 6D) containing the data of area 405 for the image data 313 to the host computer 1. Similarly, in transacting data in the middle or bottom of the bit map memory 10, the transfer start and end coordinates 311 and 312 are set ti points g and h in FIG. 7E or points i and j in FIG. 7F, respectively.

Although the above embodiment illustrates the transfer of an image data area to the host computer 1 in three divisions, the number of division is not limited to three but transferred image data may be divided into arbitrary small blocks which can be treated by the host computer one at a time.

Although the above embodiment illustrates the enlargement and rotation processes for image data, editing functions are not confined to these processes, but any other image data manipulation which can be carried out in a volatile memory 10, such as a bit map memory, may be included.

What is claimed is:

1. A method of controlling the operation of photo printer having an interface to be connected with a host computer, a nonvolatile data read/write memory, and a volatile data read/write memory, comprising:

a first step of, in response to a first command issued by said host computer indicating a print mode, converting print data sent from said host computer into dot pattern data, storing the dot pattern data in said volatile memory, and printing the dot pattern data on a sheet; and a second step of, in response to a second command issued by said host computer indicating a non-print mode, operating said nonvolatile memory as an auxiliary memory for said host computer, and operating said volatile memory as a buffer memory for said nonvolatile memory, when said second command is a read or write command issued by said host computer.

2. A photo printer control method according to claim 1, wherein said volatile memory is operated as a bit map memory in the print mode and said nonvolatile memory is a magnetic disk, said magnetic disk being accessed by said host computer through said bit map memory in response to a memory access request of said host computer in the execution step of said second step.

3. A photo printer control method according to claim 1, wherein said volatile memory is operated as a bit map memory in the print mode, and wherein, in the non-print mode, said bit map memory is accessed in response to a data read request of said host computer to read out specified data therefrom or, when the specified data is absent, data is read out of said auxiliary nonvolatile memory, and the read data is sent to said host computer.

4. A method of controlling the operation of a photo printer having a communication circuit for implementing a bidirectional data communication with a host computer, a volatile memory, a data converting circuit which converts coded print data sent from said host computer through said communication circuit into print dot data and stores the print dot data in said volatile memory, a printer engine which prints the print dot data stored in said volatile memory on print paper, and an interface circuit for receiving image data from an image scanner, comprising:
- a first step of, in response to a first command issued by said host computer indicating a print request, converting print data sent from said host computer into dot data, storing the dot data in said volatile memory, and printing the dot data with said print engine;
- a second step of, in response to a second command issued by said host computer indicated a scanner start request, storing temporarily image data from said interface circuit in said volatile memory; and
- a third step of, in response to a third command issued by said host computer indicating a transfer request, sending the image data which has been received by said interface circuit and stored in said volatile memory to said host computer.

5. A photo printer control method according to claim 4 further comprising a step of editing, in said volatile memory, the image data received by said interface circuit and stored in said volatile memory in accordance with an image data process command issued in the form of a data file by said host computer and stored in said volatile memory.

6. A photo printer control method according to claim 5, wherein said editing step comprises enlargement, reduction and rotation of an image represented by the image data stored in said volatile memory.

7. A photo printer system comprising:
- communication means for implementing bidirectional data communication with a host computer;
- a data read/write nonvolatile memory and a data read/write volatile memory;
- data developing means for developing coded print data sent from said host computer through said communication means into print dot data and for storing the print dot data in part of said volatile memory;
- a photo printer engine for printing said developed and stored print dot data on print paper; and
- request management means, operated by a program, for managing a print process request and a non-print process request issued by said host computer, said request management means comprising processor means for operating said nonvolatile memory as an auxiliary storage for said host computer in response to a non-print process request issued by said host computer and for operating said volatile memory as a cache memory for said nonvolatile memory in response to a data read/write command issued by said host computer.

8. A photo printer system according to claim 7, wherein said volatile memory comprises a bit map memory.

9. A photo printer system according to claim 7, wherein said nonvolatile memory comprises a floppy disk unit.

10. A photo printer system according to claim 7, wherein said nonvolatile memory comprises a hard disk unit.

11. A photo printer system comprising:
- communication means for implementing bidirectional data communication with a host computer;
- a volatile memory;
- data developing means for developing coded print data sent from said host computer through said communication means into print dot data and storing the print dot data in said volatile memory;
- a photo printer engine for printing said developed and stored print dot data on a sheet;
- interface means for receiving image data from an image scanner and for storing the image data in said volatile memory; and
- processing means responsive to a print process request for initiating a print mode in which coded print data is developed by said data developing means into print dot data which is then stored in said volatile memory for printing by said photo printer engine, and responsive to an image scanner start request and a data transfer request from said host computer for initiating a non-print mode in which image data picked up by said image scanner is temporarily stored in said volatile memory in response to the image scanner start request, and afterward the stored image data is sent from said volatile memory to said host computer in response to the data transfer request.

12. A photo printer system according to claim 11, wherein said volatile memory comprises a bit map memory, 13. A photo printer system according to claim 11 further comprising program means for editing the image data stored in said volatile memory during said non-print mode in accordance with an image data process command issued by said host computer.

* * * * *